(12) United States Patent
Yoshino et al.

(10) Patent No.: US 7,604,193 B2
(45) Date of Patent: Oct. 20, 2009

(54) INFORMATION RECORDING MEDIUM

(75) Inventors: Yuji Yoshino, Tokyo (JP); Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 623 days.

(21) Appl. No.: 11/410,203

(22) Filed: Apr. 25, 2006

(65) Prior Publication Data

US 2006/0283730 A1    Dec. 21, 2006

(30) Foreign Application Priority Data

Apr. 27, 2005   (JP)   ............................. 2005-128929

(51) Int. Cl.
  *G11B 23/107*   (2006.01)
  *B65D 85/00*   (2006.01)

(52) U.S. Cl. .................... 242/348; 206/387.1; 206/307; 220/4.21

(58) Field of Classification Search ................. 242/347, 242/348, 335, 341; 206/232, 310, 449, 387.1, 206/387.12, 387.13, 472; 220/4.21, 4.24
  See application file for complete search history.

(56) References Cited

U.S. PATENT DOCUMENTS 4,125,189 A * 11/1978 Fujimoto et al. ......... 206/387.1
4,322,000 A * 3/1982 Struble .................... 206/387.1
4,913,287 A * 4/1990 Kagano ................... 206/387.1
5,450,950 A * 9/1995 Randolph et al. ........... 206/232
5,785,176 A * 7/1998 Katagiri et al. .......... 206/387.1
6,019,219 A * 2/2000 Takahashi ................ 206/387.1
6,874,631 B1 * 4/2005 Hiraguchi et al. ...... 206/387.13

FOREIGN PATENT DOCUMENTS

JP            9-161446          6/1997

OTHER PUBLICATIONS

English Language Abstract of JP 9-161446.

* cited by examiner

*Primary Examiner*—William A Rivera
(74) *Attorney, Agent, or Firm*—Greenblum & Bernstein, P.L.C.

(57) ABSTRACT

An information recording medium capable of avoiding insertion of a sheet material into a drive unit. The information recording medium is comprised of a tape cartridge that rotatably accommodates a tape reel wound with a tape-shaped recording medium (magnetic tape), a storage case that accommodates the tape cartridge, and a sheet material that is accommodated in the storage case together with the tape cartridge. The sheet material is formed to have a size in an unfolded state small enough to be accommodated in the storage case, and is accommodated in the storage case in a state where the sheet material is folded along a folding line.

7 Claims, 4 Drawing Sheets

INFORMATION RECORDING MEDIUM

BACKGROUND OF THE INVENTION

1. Field of the Invention

The present invention relates to an information recording medium comprised of a tape cartridge that rotatably accommodates a tape reel wound with a tape-shaped recording medium, a storage case that accommodates the tape cartridge, and a sheet material that is accommodated in the storage case together with the tape cartridge.

2. Description of the Related Art

As an information recording medium of the above-mentioned kind, there has been proposed an information recording medium in Japanese Laid-Open Patent Publication (Kokai) No. H09-161446. This information recording medium includes a single-reel cartridge type information recording medium (hereinafter also referred to as "the tape cartridge") which is used as a backup medium for backing up recording data recorded e.g., on a main recording medium of an electronic computer, and a storage case accommodating the tape cartridge. In this case, the tape cartridge is formed in the shape of a flat rectangular parallelepiped which has a substantially square shape in plan view. The storage case has a storage case body made of a transparent resin material, a lid, and a connecting portion, and is configured such that the storage case body and the lid are foldably connected to the connecting portion. Further, the storage case body and the lid are formed to have shapes rectangular in plan view and slightly larger than that of the tape cartridge, so that the storage case can accommodate the tape cartridge with as little rattling of the tape cartridge as possible.

Furthermore, the information recording medium has sheet materials, such as a paper sheet printed with a commodity name, instructions for use, a manufacturer, etc., and a label sheet used by being affixed to the tape cartridge, accommodated in the storage case thereof together with the tape cartridge. In this case, if a sheet material has a shape in plan view larger than that of the cartridge case, and hence cannot be accommodated in the storage case as it is, it is folded in two or three and accommodated in the storage. On the other hand, if a sheet material has a shape in plan view smaller than that of the cartridge case, it is accommodated in the storage case as it is without being folded. Further, in a storage case of a general type, unlike the storage case disclosed in the aforementioned publication, annular teeth which mesh with driving engaging teeth of a tape reel that are exposed from the center of the back surface of a cartridge case is not formed in a storage case body thereof. For this reason, an information recording medium provided with the storage case constructed as above has a sheet material provided on at least one of the top surface and the back surface of the cartridge case.

SUMMARY OF THE INVENTION

However, from the study of the above-described information recording medium, the present inventors found out the following problem: Within the storage case of the information recording medium, the tape cartridge and the sheet material rub with each other due to vibrations applied during transfer, thereby generating static electricity, and the sheet material sometimes adheres to the tape cartridge by the static electricity. Therefore, the information recording medium suffers from the problem that when the sheet material adheres to the back surface of the tape cartridge, it is difficult to notice the adhesion of the sheet material, and hence there is the risk that the user, who has removed the tape cartridge from the storage case, inserts the sheet material together with the tape cartridge into a drive unit without being aware of the existence of the sheet material. In the case of occurrence of such an event, the drive unit sometimes do not operate normally due to the insertion of the sheet material, and hence improvement in this point is desired.

The present invention has been made to solve the problem described above, and a main object thereof is to provide an information recording medium which is capable of avoiding insertion of a sheet material into a drive unit.

To attain the above object, the present invention provides an information recording medium comprising a tape cartridge that rotatably accommodates a tape reel wound with a tape-shaped recording medium, a storage case that accommodates the tape cartridge, and a sheet material that is accommodated in the storage case together with the tape cartridge, wherein the sheet material is formed to have a size in an unfolded state small enough to be accommodated in the storage case, and is accommodated in the storage case in a state where the sheet material is folded along a folding line.

According to this information recording medium, the sheet material having a size in an unfolded state small enough to be accommodated in the storage case is accommodated in the storage case in a state where the sheet material is folded along the folding line. Therefore, when the tape cartridge is removed from the storage case, even if the sheet material adheres to the lower surface of the tape cartridge by static electricity, a force applied to a portion of the sheet material in contact with the tape cartridge is imbalanced since the sheet material is folded to reduce a contact area between the sheet material and the tape cartridge and moreover there exists a folded portion of the sheet material which is not in contact with the lower surface of the tape cartridge. Therefore, when the tape cartridge is inserted into the drive unit from an insertion hole thereof, the sheet material is easily peeled off (in a state likely to be peeled off) from the tape cartridge due to its own weight. Further, even if the tape cartridge with the sheet material adhering to the lower surface thereof is attempted to be inserted into the drive unit, the folded portion of the sheet material hangs down by its own weight. According to the information recording medium, therefore, when the tape cartridge is being inserted into the insertion hole of the drive unit, the folded portion of the sheet material is brought into contact with a front panel of the drive unit, and at this time, a force in a direction opposite to the direction of insertion of the tape cartridge is applied to the folded portion of the sheet material from the front panel. As a result, the sheet material is separated from the lower surface of the tape cartridge by the force received from the front panel and drops. Therefore, according to the information recording medium, it is possible to reliably prevent the sheet material from being inserted into the drive unit.

In this case, a perforated line may be formed on the folding line of the sheet material. According to this information recording medium, it is possible to efficiently perform the operation of folding the sheet material along the folding line. Further, due to provision of the perforated line, the strength of the folded portion can be reduced compared with a sheet material with no perforated line. This makes it possible to reliably change the sheet material adhering to the lower surface of the tape cartridge by static electricity into a state in which the folded portion hangs down. As a result, it is possible to more reliably prevent the sheet material from being inserted into the drive unit.

Further, the sheet material may be accommodated in the storage case in a state where the sheet material is folded in two such that the folding line is located on a back side of a folded portion folded along the folding line, as viewed in a direction of insertion of the tape cartridge into a drive unit. According to this information recording medium, when the tape cartridge having the sheet material adhering to the lower surface thereof by static electricity is attempted to be inserted into the insertion hole of the drive unit, it is possible to bring a foremost end of the folded portion into contact with the rim of the insertion hole of the front panel of the drive unit. Therefore, the folded portion can be caused to further hang down by the force received from the front panel, and hence it is possible to more reliably prevent the sheet material from being inserted into the drive unit.

Further, the sheet material may be accommodated in the storage case in a state where the sheet material is folded in three along two folding lines. According to this information recording medium, similarly to the above-described configuration in which the sheet material is folded in two, it is possible to reliably prevent the sheet material from being inserted into the drive unit.

Furthermore, the sheet material may be accommodated in the storage case in a state where portions of respective folded portions folded along the two folding lines overlap each other. According to this information recording medium, in the state where the sheet material adheres to the lower surface of the tape cartridge by static electricity, it is possible to press down the foremost end of the folded portion located downward of the folded portion by a force of the folded portion located on the side of the adhering portion of the sheet material (upward of the folded portion) and being about to hang down. Therefore, according to this information recording medium, since the folded portion further hangs down, it is possible to reliably prevent the sheet material from being inserted into the drive unit.

It should be noted that the present disclosure relates to the subject matter included in Japanese Patent Application No. 2005-128929 filed Apr. 27, 2005, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Hereinafter, the best mode of an information recording medium according to the present invention will be described with reference to the accompanying drawings.

First, a description will be given of the construction of the information recording medium 1 with reference to the drawings.

Figure 1:
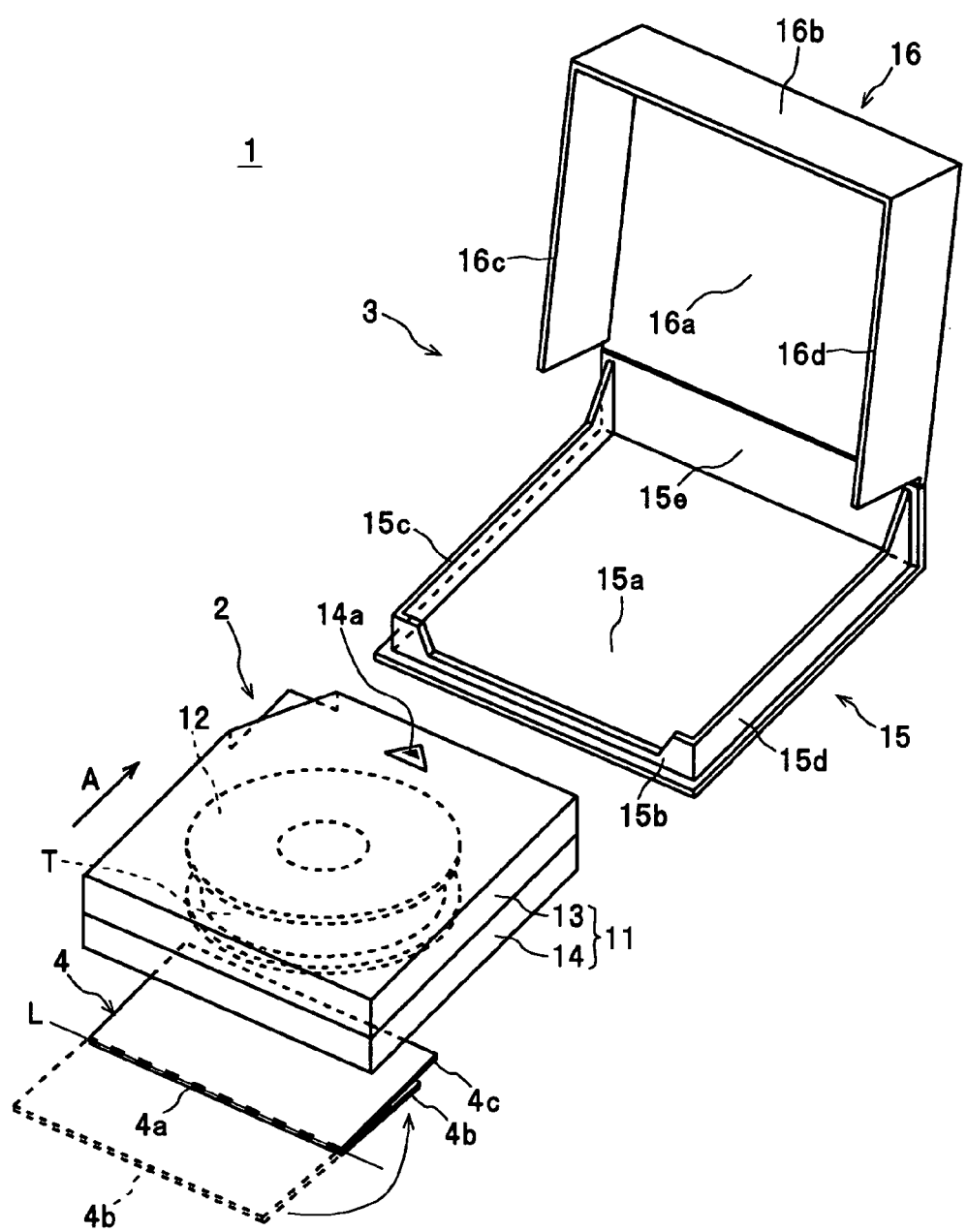
FIG. 1 is a perspective view showing the construction of an information recording medium.

Referring to FIG. 1, the information recording medium 1 is a single-reel cartridge type information recording medium used for example as a storage device for backing up recording data recorded on an electronic computer, and is comprised of a tape cartridge 2, a storage case 3, and a sheet material 4, as shown in FIG. 1. Although among sheet materials to be accommodated in the storage case 3, there are some which are too large in an unfolded state (state before the sheet materials are folded) to be fully accommodated in the storage case 3 and hence are accommodated in a state where the sheet materials are folded in two or three, in the present embodiment, for ease of understanding of the present invention, a description will be given, by way of example, of the case in which the storage case 3 accommodates only a sheet material 4 which has a planar shape smaller than that of the cartridge case 2 and can be accommodated in the storage case 3 even in an unfolded state, i.e., in a state where the sheet material is not folded.

As shown in FIG. 1, the tape cartridge 2 is comprised of not only a cartridge case body 11, and a tape reel 12, but also a brake release plate, a lock member, a brake spring, and a door member, none of which are shown. In this case, the cartridge case body 11 is formed by a lower case 13 and an upper case 14, which are shallow plate-shaped and are fitted to each other, and rotatably accommodates the tape reel 12 wound with a magnetic tape T (tape-shaped recording medium in the present invention) in an inner space defined between the lower case 13 and the upper case 14. Further, the brake release plate, the lock member, the brake spring, etc., are arranged in the inner space of the cartridge case body 11. Further, on a side wall of the cartridge case body 11, a tape outlet (not shown) is formed for pulling out the magnetic tape T from the cartridge case body 11, and the door member is disposed in the cartridge case body 11 so that the door member can open and close the tape outlet. Further, on the upper surface of the upper case 14, a mark (triangle mark) 14a is formed to indicate a direction A of insertion of the tape cartridge 2 into a drive unit.

As shown in FIG. 1, the storage case 3 is comprised of a storage case body 15, and a lid 16, which are integrally formed e.g., of a transparent resin material. The storage case body 15 is comprised of a bottom wall 15a (forming the bottom wall of the storage case 3) formed to have a square shape that is slightly larger than that of the tape cartridge 2 in plan view, as well as a front wall 15b, side walls 15c and 15d, and a rear wall 15e, which are erected on the four sides of the bottom wall 15a, respectively. In this case, the front wall 15b and the side walls 15c and 15d are erected on portions located slightly inward of the sides of the bottom wall 15a, respectively. The lid 16 is comprised of an upper wall 16a (forming the upper wall of the storage case 3) hinged to the edge of an upper end of the rear wall 15e that is the highest wall of the walls 15b, 15c, 15d, and 15e of the storage case body 15, as well as a front wall 16b (forming the front wall of the storage case 3), and side walls 16c and 16d (forming the side walls of the storage case 3, respectively), which are erected on the three sides of the upper wall 16a, respectively. In this case, the upper wall 16a is formed to have approximately the same size and the same shape as those of the bottom wall 15a. Further, the upper wall 16a and the rear wall 15e are hinged to each other by reducing the thickness of a connecting portion connecting the upper wall 16a and the rear wall 15e. The front wall 16b and the side walls 16c and 16d are formed to have approximately the same height as that of the rear wall 15e, and the front wall 16b is connected to the side walls 16c and 16d. With the above configuration, when the lid 16 is placed on the storage case body 15, the front wall 16b and the side walls 16c and 16d of the lid 16 are located outside the front wall 15b and the side walls 15c and 15d of the storage case body 15, respectively, and at the same time the respective edges of the upper ends of the front wall 16b and the side walls 16c and 16d are brought into contact with the surface of the bottom wall 15a of the storage case body 15. Thus, an accommodating space for accommodating the tape cartridge 2 and the sheet material 4 is formed in the storage case 3 by the bottom wall 15a and the rear wall 15e of the storage case body 15, and the upper wall 16a and the side walls 16c and 16d of the lid 16.

Figure 2:
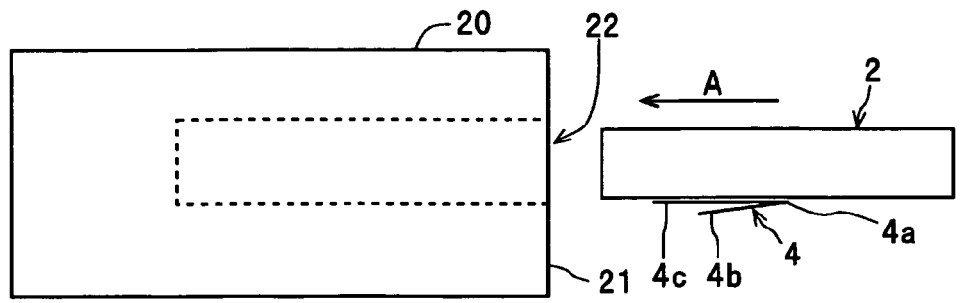
FIG. 2 is a side view of a tape cartridge with a sheet material folded in two adhering thereto.

As shown in FIG. 1, the sheet material 4 is formed to have a predetermined shape (square shape, for example) smaller in size (outer shape) in plan view in an unfolded state (state indicated by solid lines and broken lines) than the cartridge case. Further, in the sheet material 4, a perforated line 4a on a folding line L parallel to a pair of sides opposite to each other, and the sheet material 4 is folded in two along the perforated line 4a (state indicated by the solid lines alone). Further, as shown in FIGS. 1 and 2, the sheet material 4 is accommodated in the storage case 3 in the state where the sheet material 4 is folded in two (state indicated by the solid lines alone in FIG. 1) such that the folding line L is located on a back side of a folded portion 4b of the sheet material 4 folded along the folding line L, as viewed in the direction A of insertion of the tape cartridge 2 into the drive unit 20. More specifically, the sheet material 4 is accommodated in the storage case 3, for example, in a state where the sheet material 4 is disposed on the lower surface of the tape cartridge 2 such that the perforated line 4a (folding line L) is approximately perpendicular to the direction A of insertion of the tape cartridge 2, and at the same placed on the bottom wall 15a together with the tape cartridge 2.

Figure 3:
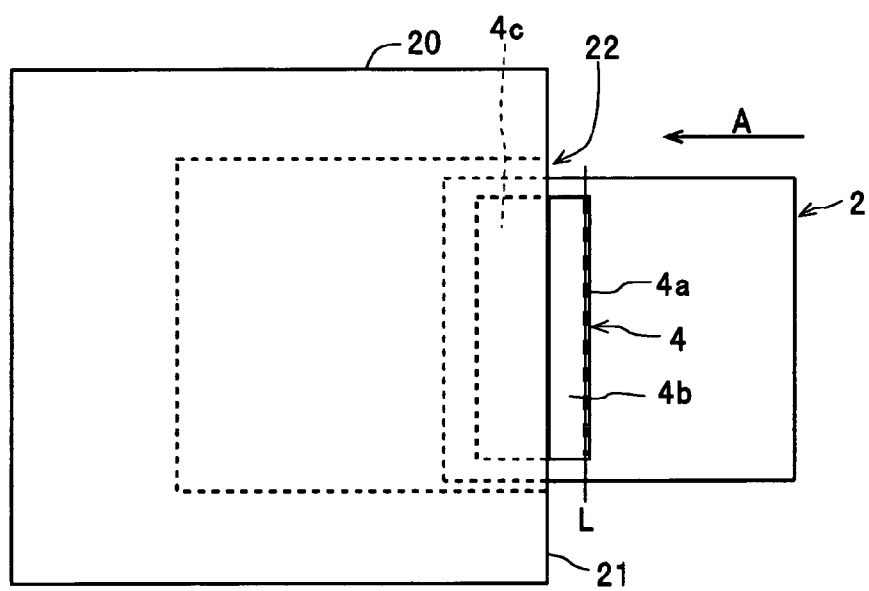
FIG. 3 is a bottom view of the FIG. 2 tape cartridge being inserted into a drive unit, as viewed from a lower surface side of the tape cartridge.

As described above, in the information recording medium 1, the storage case 3 accommodates the sheet material 4 having a size in an unfolded state small enough to be accommodated in the storage case 3 and being folded (in two) along the folding line L. Therefore, when the tape cartridge 2 is taken out from the storage case 3, even if the sheet material 4 adherers to the lower surface of the tape cartridge 2 by static electricity, a force applied to a sheet main body portion 4c of the sheet material 4 in contact with the tape cartridge 2 is imbalanced since the sheet material 4 is folded to reduce a contact area between the sheet material 4 and the tape cartridge 2 and moreover there is a portion (folded portion 4b) which is not in contact with the lower surface of the tape cartridge 2. As a result, as shown in FIG. 2, when the tape cartridge 2 is inserted into the drive unit 20 from an insertion hole 22 opened in a front panel 21 of the drive unit 20, the sheet material 4 is easily peeled off (in a state likely to be peeled off) from the tape cartridge 2 due to its own weight. Further, even if the tape cartridge 2 having the sheet material 4 adhering to the lower surface thereof is attempted to be inserted into the drive unit 20, as shown in FIG. 2, the folded portion 4b of the sheet material 4 hangs down by its own weight. Therefore, in the information recording medium 1, as shown in FIG. 3, when the tape cartridge 2 is being inserted into the insertion hole 22, the folded portion 4b of the sheet material 4 is brought into contact with the front panel 21, and at this time, a force in a direction opposite to the direction A of insertion of the tape cartridge 2 is applied to the folded portion 4b (sheet material 4) from the front panel 21. As a result, the sheet material 4 is separated from the lower surface of the tape cartridge 2 by the force received from the front panel 21 and drops.

As described hereinabove, according to the information recording medium 1, the sheet material 4 having a size in an unfolded state small enough to be accommodated in the storage case 3 is folded along the folding line L, and is accommodated in this state in the storage case 3. This makes it possible to reliably prevent the sheet material 4 from being inserted into the drive unit 20.

Further, according to the information recording medium 1, the perforated line 4a is formed on the folding line L of the sheet material 4, whereby it is possible to efficiently perform the operation of folding the sheet material 4 along the folding line L. Further, due to provision of the perforated line 4a, the strength of the folded portion can be reduced compared with a sheet material with no perforated line 4a. This makes it possible to reliably change the sheet material 4 adhering to the lower surface of the tape cartridge 2 by static electricity into a state in which the folded portion 4b hangs down. As a result, it is possible to more reliably prevent the sheet material 4 from being inserted into the drive unit 20. It should be noted that when the sheet material is formed by a material which is easy to fold, it is possible to employ a construction in which no perforated line 4a is formed on the folding line L.

Furthermore, the sheet material 4 is accommodated in the storage case 3 in the state where the sheet material is folded in two such that the folding line L is located on a back side of the folded portion 4b folded along the folding line L as viewed in the direction A of insertion of the tape cartridge 2 into the drive unit 20. As a consequence, when the tape cartridge 2 having the sheet material 4 adhering to the lower surface thereof by static electricity is attempted to be inserted into the insertion hole 22 of the drive unit 20, it is possible to bring a foremost end of the folded portion 4b (foremost end in the direction A of insertion of the tape cartridge 2) into contact with the rim of the insertion hole 22 of the front panel 21. Therefore, the folded portion 4b can be caused to further hang down by the force received from the front panel 21, and it is possible to more reliably prevent the sheet material 4 from being inserted into the drive unit 20.

Figure 4:
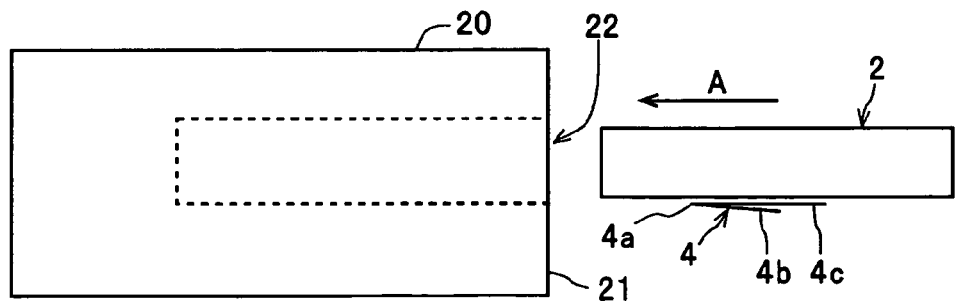
FIG. 4 is a side view of the tape cartridge with the sheet material adhering thereto in a state where the sheet material is oriented in an opposite direction to the direction of orientation of the sheet material in FIG. 2.

It should be noted that the present invention is by no means limited to the above-described configuration. For example, although it is preferable for the above-described reason that the sheet material 4 is accommodated in the storage case 3 such that the folding line L is located on the back side of the folded portion 4b as viewed in the direction A of insertion of the tape cartridge 2, it is also possible to employ a configuration in which the sheet material 4 is accommodated in the storage case 3 in a state where the sheet material 4 is oriented in a direction opposite to the above, that is, in a state where the folded portion 4b is located on a back side of the perforated line 4a (folding line L) as viewed in the direction A of insertion of the tape cartridge 2. In this configuration as well, as shown in FIG. 4, when the tape cartridge 2 having the sheet material 4 adhering to the lower surface thereof by static electricity is attempted to be inserted into the drive unit 20, the folded portion 4b having hung down is brought into contact with the rim of the insertion hole 22 of the front panel 21 of the drive unit 20. This makes it possible to reliably prevent the sheet material 4 from being inserted into the drive unit 20.

Figure 5:
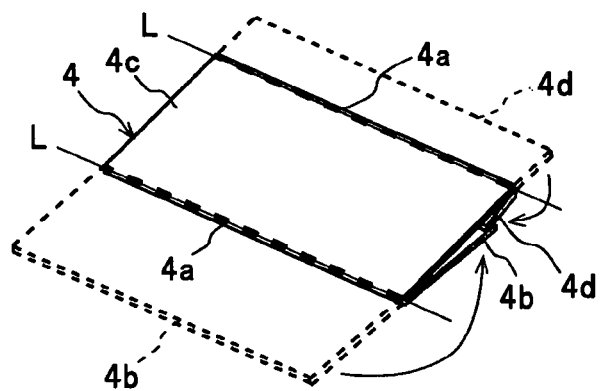
FIG. 5 is a perspective view of the sheet material in a state where the sheet material is folded in three.
Figure 6:
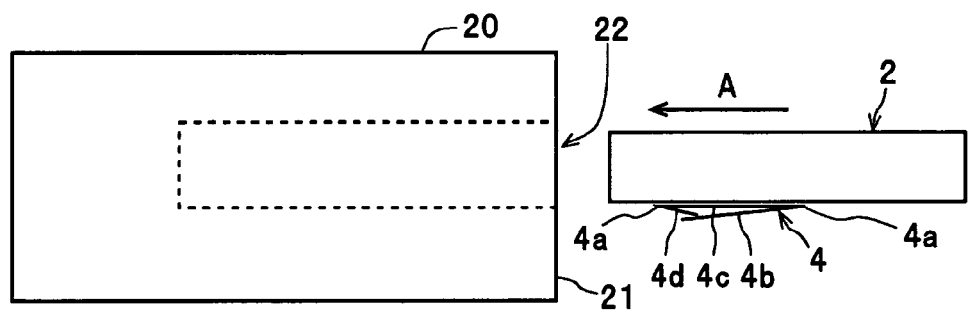
FIG. 6 is a side view of the tape cartridge with the sheet material adhering thereto in the state where the sheet material is folded in three.
Figure 7:
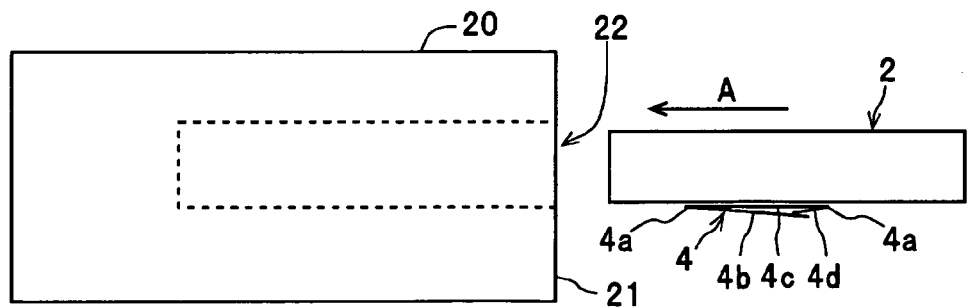
FIG. 7 is a side view of the tape cartridge with the sheet material adhering thereto in a state where the sheet material is oriented in an opposite direction to the direction of orientation of the sheet material in FIG. 6.

Further, although the sheet material 4 is folded in two in the above-described configuration, it is also possible to fold the sheet material 4 in three and accommodate it in the storage case 3, as shown in FIG. 5. With this configuration as well, similarly to the above-described configuration in which the sheet material 4 is folded in two, it is possible to reliably prevent the sheet material 4 from being inserted into the drive unit 20. Further, similarly, it is preferable to form perforated lines 4a on two folding lines L, respectively. Further, although the sheet material 4 may be folded along the perforated lines 4a (folding lines L) such that folded portions 4b and 4d connected to the sheet main body portion 4c (portion in contact with the tape cartridge 2) in the center of the sheet material 4 via the perforated lines 4a (folding lines L), respectively, do not overlap each other, it is more preferable to cause the foremost ends (portions of the respective folded portions in the present invention) of the sheet material 4 to overlap each other, as shown in FIG. 5. As described above, by causing the folded portions 4b and 4d to overlap each other, as shown in FIG. 6, it is possible to press down the foremost end of the folded portion 4b located downward of the folded portion 4d by a force of the folded portion 4d located on the sheet main body portion 4c side (upward of the folded portion 4b) and being about to hang down in the state where the sheet material 4 adheres to the lower surface of the tape cartridge 2 by static electricity. Therefore, since the folded portion 4b further hangs down, it is possible to prevent the sheet material from being inserted into the drive unit 20 more reliably. Further, the sheet material 4 folded in three may be accommodated in the storage case 3, as shown in FIG. 6, such that in the state where the sheet material 4 adheres to the tape cartridge 2, the perforated line 4a on the folded portion 4d side is located forward of the perforated line 4a on the folded portion 4b side as viewed in the direction A of insertion of the tape cartridge 2. Inversely, as shown in FIG. 7, it is also possible to accommodate the sheet material 4 folded in three in the storage case 3 in a state where the perforated line 4a on the folded portion 4d side positioned upward of the folded portion 4b is located backward of the perforated line 4a on the folded portion 4b side as viewed in the direction A of insertion of the tape cartridge 2.

Figure 8:
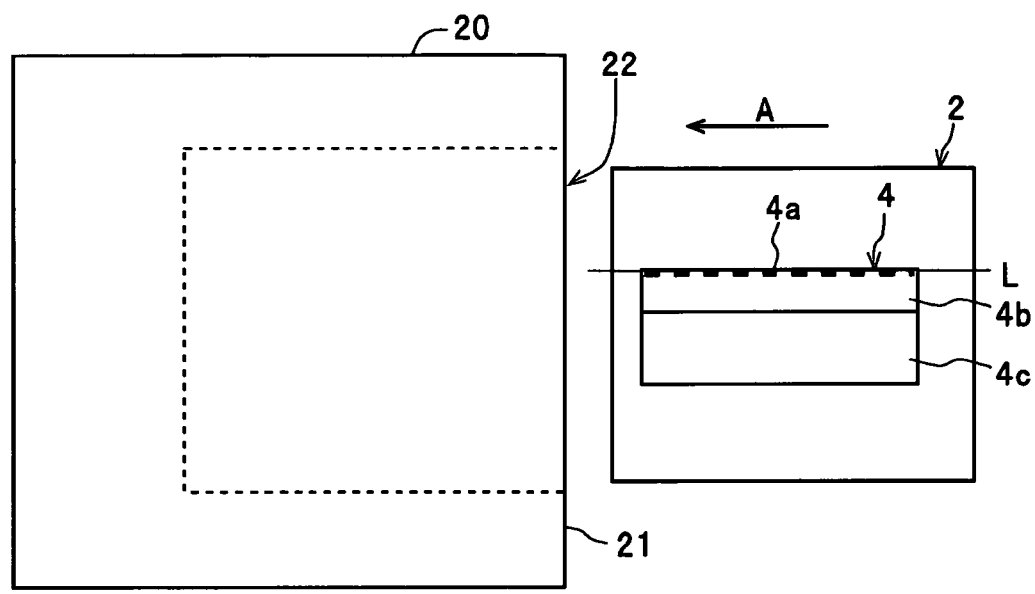
FIG. 8 is a bottom view of the tape cartridge with a sheet material adhering thereto in a state in which a perforated line of the sheet material is substantially parallel to a direction of insertion of the tape cartridge, as viewed from a lower surface side of the tape cartridge.

Further although in the above-described configuration, as shown in FIG. 3, the sheet material 4 adhering to the lower surface of the tape cartridge 2 is accommodated in the storage case 3 such that the perforated line 4a (folding line L) formed in the sheet material 4 is approximately perpendicular to the direction A of insertion of the tape cartridge 2, this is not limited, but for example, as shown in FIG. 8, the sheet material 4 adhering to the lower surface of the tape cartridge 2 can also be accommodated in the storage case 3 such that the perforated line 4a (folding line L) is approximately in parallel with the direction A of insertion of the tape cartridge 2.

Further although in the above-described configuration, the square sheet material 4 is folded along the folding line L parallel to a pair of sides thereof, the direction of folding the sheet material 4 is not limited, either. For example, it is also possible to employ a configuration in which at least one corner of the sheet material 4 is folded. Further, although in the configuration in which the sheet material 4 is folded in three, the sheet material 4 is accommodated in the storage case 3 in the state where the sheet main body portion 4c is in contact with the lower surface of the tape cartridge 2, this is not limited, but inversely the sheet material 4 can also be accommodated in the storage case 3 such that the folded portions 4b and 4d are facing the tape cartridge 2. Further, in place of the configuration in which the sheet material 4 is folded in two or three, it is also possible to employ a configuration in which the sheet material 4 is folded in four or more and accommodated in the storage case 3.

What is claimed is:

1. An information recording medium comprising:
   a tape cartridge that rotatably accommodates a tape reel wound with a tape-shaped recording medium;
   a storage case that accommodates the tape cartridge; and
   a sheet material that is accommodated in the storage case together with the tape cartridge,
   wherein the sheet material is formed to have a size in an unfolded state small enough to be accommodated in the storage case, and is accommodated in the storage case in a state where the sheet material is folded along a folding line, a perforated line being formed on the folding line of the sheet material.

2. An information recording medium according to claim 1, wherein the sheet material is accommodated in the storage case in a state where the sheet material is folded in two such that the folding line is located on a back side of a folded portion folded along the folding line, as viewed in a direction of insertion of the tape cartridge into a drive unit.

3. An information recording medium according to claim 1, wherein the sheet material is accommodated in the storage case in a state where the sheet material is folded in three in which the sheet material is folded along two folding lines.

4. An information recording medium according to claim 3, wherein the sheet material is accommodated in the storage case in a state where portions of respective folded portions folded along the two folding lines overlap each other.

5. An information recording medium comprising:
   a tape cartridge that rotatably accommodates a tape reel wound with a tape-shaped recording medium;
   a storage case that accommodates the tape cartridge; and
   a sheet material that is accommodated in the storage case together with the tape cartridge,
   wherein the sheet material is formed to have a size in an unfolded state small enough to be accommodated in the storage case, and is accommodated in the storage case in a state where the sheet material is folded along a folding line, and the sheet material is accommodated in the storage case in a state where the sheet material is folded in two such that the folding line is located on a back side of a folded portion folded along the folding line, as viewed in a direction of insertion of the tape cartridge into a drive unit.

6. An information recording medium comprising:
   a tape cartridge that rotatably accommodates a tape reel wound with a tape-shaped recording medium;
   a storage case that accommodates the tape cartridge; and
   a sheet material that is accommodated in the storage case together with the tape cartridge,
   wherein the sheet material is formed to have a size in an unfolded state small enough to be accommodated in the storage case, and is accommodated in the storage case in a state where the sheet material is folded along a folding line, and the sheet material is accommodated in the storage case in a state where the sheet material is folded in three in which the sheet material is folded along two folding lines.

7. An information recording medium according to claim 6, wherein the sheet material is accommodated in the storage case in a state where portions of respective folded portions folded along the two folding lines overlap each other.

* * * * *